H. AUSTIN.
Tire Tightener.
No. 54,485 — Patented May 8, 1866.
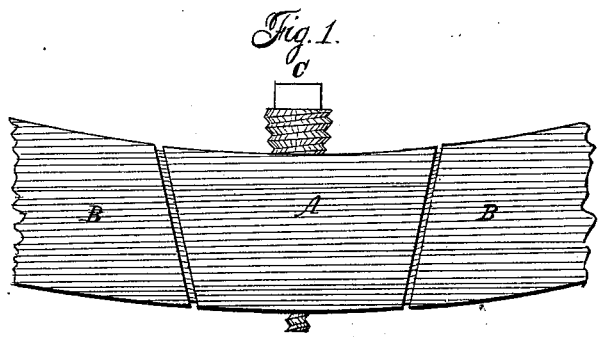
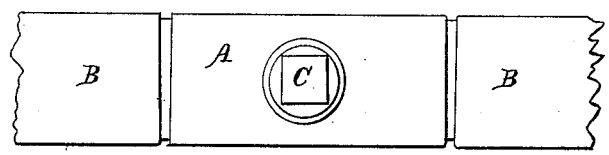
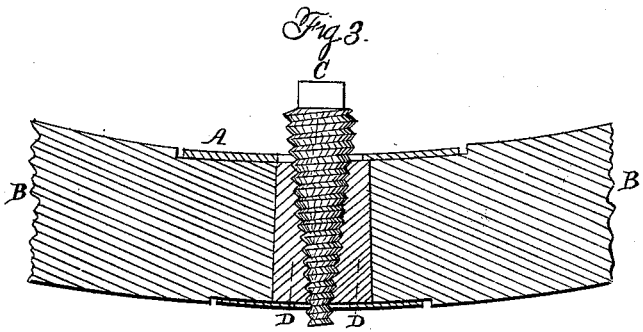

UNITED STATES PATENT OFFICE.

HAINES AUSTIN, OF EAST LIBERTY, OHIO.

IMPROVEMENT IN COUPLINGS FOR CARRIAGE-FELLIES.

Specification forming part of Letters Patent No. 54,485, dated May 8, 1866.

*To all whom it may concern:*

Be it known that I, HAINES AUSTIN, of East Liberty, Logan county, State of Ohio, have invented certain new and useful Improvements in Adjustable Couplings or Connections for the Fellies of Carriage and other Wheels; and I do hereby declare the following description and accompanying drawings are sufficient to enable any person skilled in the art or science to which it most nearly appertains to make and use my said invention or improvements without further invention or experiment.

The nature of my invention and improvements consists in a box or tube to receive the ends of the fellies, and providing said box with a conical screw, and two metal blocks with semicircular female screws, which blocks act against the ends of the fellies as the conical screw is turned in, and press the ends of the fellies farther apart, to adjust the pressure of the fellies against the tire of the wheel.

In the accompanying drawings, Figure 1 is an elevation of my improved coupling. Fig. 2 is a plan, and Fig. 3 a section on the line z z of Fig. 2.

In these drawings A is a strong metal tube or box, made in the form shown, or in such other form as will answer the purpose, and open at the ends to receive the ends of the fellies B B, as shown in the drawings. This box A is perforated for the screw C, which passes through the box and may enter a cavity or hole in the tire of the wheel. This screw C is made conical, as shown in Fig. 3, and there are two metal blocks, D D, fitted to traverse freely inside of the box A, as shown in the section, Fig. 3. These blocks D D have semicircular female screw-threads in them, fitted to the conical screw C, as shown in Fig. 3, so that when the screw C is screwed in between the blocks it forces them apart, and as they act against the ends of the fellies they are forced apart also, to increase the pressure of the fellies against the tire of the wheel.

This invention may be used as follows—that is, the ends of the fellies may be fitted into the ends of the box against the blocks D D, and the tire put on hot or cold, and after the tire is put on the screw C may be turned in to push the blocks and the ends of the fellies apart and adjust the pressure of the fellies against the tire; and if the tire is to be put on cold it may be best to use two couplings, arranged diametrically opposite to each other.

The screw C may be turned back when the wheel is exposed to wet, so as to take some of the increased pressure off of the tire and fellies, and when the wheel is dried the screw may be turned in to tighten the fellies in the tire.

What I claim as my invention and improvements in adjustable couplings or connections for the fellies of carriage or other wheels is—

The combination and arrangement of the tube or box A with the conical male screw C and blocks D D, with semicircular female screws, working in said box, for the purpose set forth, substantially as described.

HAINES AUSTIN.

Witnesses:
JOSEPH S. COWGILL,
CARLISLE H. AUSTIN.